US011880993B2

(12) United States Patent
Oki

(10) Patent No.: US 11,880,993 B2
(45) Date of Patent: Jan. 23, 2024

(54) IMAGE PROCESSING DEVICE, DRIVING ASSISTANCE SYSTEM, IMAGE PROCESSING METHOD, AND PROGRAM

(71) Applicants: TOSHIBA ELECTRONIC DEVICES & STORAGE CORPORATION, Tokyo (JP); KABUSHIKI KAISHA TOSHIBA, Tokyo (JP)

(72) Inventor: Yutaka Oki, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 396 days.

(21) Appl. No.: 16/285,105

(22) Filed: Feb. 25, 2019

(65) Prior Publication Data

US 2020/0074660 A1    Mar. 5, 2020

(30) Foreign Application Priority Data

Sep. 3, 2018    (JP) .................................. 2018-164818

(51) Int. Cl.
*H04N 13/128*      (2018.01)
*G06T 7/593*      (2017.01)
(Continued)

(52) U.S. Cl.
CPC .............. *G06T 7/593* (2017.01); *G06T 7/174* (2017.01); *G06T 7/85* (2017.01); *G06V 20/588* (2022.01);
(Continued)

(58) Field of Classification Search
CPC .................................................... H04N 13/128
(Continued)

(56) References Cited

U.S. PATENT DOCUMENTS 6,985,619 B1    1/2006    Seta et al.
9,378,553 B2    6/2016    Tamura et al.
(Continued)

FOREIGN PATENT DOCUMENTS

CN    104949619 A    9/2015
EP    1087626 A2    3/2001
(Continued)

OTHER PUBLICATIONS

Benmansour et al. "Stereovision-based 3D lane detection system: a model driven approach", IEEE 11th International Conference on Intelligent Transportation Systems, Piscataway, NJ, USA, Oct. 12, 2008, pp. 182-188.
(Continued)

*Primary Examiner* — Michael H Hong
(74) *Attorney, Agent, or Firm* — Kim & Stewart LLP

(57) ABSTRACT

An image processing device used in determining a distance to an object includes a memory that stores a stereo image of the object including first and second images, and a processor configured to detect first and second reference lines in the first image, calculate disparity between the first and second images, correct, using the calculated disparity, a position of the first reference line in the second image, and calculate a parameter for determining the distance to the object, the parameter indicating a difference between the first and second images based on a distance between the first and second reference lines in the first image and disparity between the first reference line in the first image and the corrected first reference line in the second image.

13 Claims, 7 Drawing Sheets

(51) Int. Cl.
  *G06T 7/80* (2017.01)
  *G06T 7/174* (2017.01)
  *G06V 20/56* (2022.01)
  *B60R 1/00* (2022.01)
  *H04N 13/00* (2018.01)

(52) U.S. Cl.
  CPC .............. *H04N 13/128* (2018.05); *B60R 1/00* (2013.01); *B60R 2300/105* (2013.01); *B60R 2300/107* (2013.01); *B60R 2300/30* (2013.01); *G06T 2207/10012* (2013.01); *G06T 2207/30256* (2013.01); *H04N 2013/0081* (2013.01)

(58) Field of Classification Search
  USPC .......................................................... 348/46
  See application file for complete search history.

(56) References Cited

U.S. PATENT DOCUMENTS

| | | | | |
|---|---|---|---|---|
| 2014/0003704 | A1* | 1/2014 | Liao | G06T 7/593 382/154 |
| 2014/0063199 | A1* | 3/2014 | Kim | H04N 13/239 348/47 |
| 2014/0133741 | A1* | 5/2014 | Wang | G06T 7/543 382/154 |
| 2016/0150211 | A1* | 5/2016 | Hwang | G06T 3/0093 348/43 |
| 2017/0201736 | A1 | 7/2017 | Ishimaru et al. | |
| 2017/0341583 | A1* | 11/2017 | Zhang | B60R 1/00 |
| 2018/0211400 | A1* | 7/2018 | Park | H04N 13/122 |
| 2019/0266388 | A1* | 8/2019 | Kolagunda | G06K 9/00308 |
| 2019/0297254 | A1 | 9/2019 | Oki | |
| 2020/0020075 | A1* | 1/2020 | Khwaja | G06T 5/002 |
| 2020/0104607 | A1* | 4/2020 | Kim | G06K 9/00798 |

FOREIGN PATENT DOCUMENTS

| | | |
|---|---|---|
| JP | 2015-191548 A | 11/2015 |
| JP | 2016-8847 A | 1/2016 |
| JP | 5906272 B2 | 4/2016 |
| WO | 2016/203989 A1 | 12/2016 |
| WO | 2016203989 A1 | 12/2016 |

OTHER PUBLICATIONS

Extended European Search Report dated Sep. 30, 2019 in corresponding European Patent Application No. 19160249.9, 10 pages.
Unpublished U.S. Appl. No. 16/129,014.

\* cited by examiner

IMAGE PROCESSING DEVICE, DRIVING ASSISTANCE SYSTEM, IMAGE PROCESSING METHOD, AND PROGRAM

CROSS-REFERENCE TO RELATED APPLICATION

This application is based upon and claims the benefit of priority from Japanese Patent Application No. 2018-164818, filed Sep. 3, 2018, the entire contents of which are incorporated herein by reference.

FIELD

Embodiments described herein relate generally to an image processing device, a driving assistance system, an image processing method, and a program.

BACKGROUND

For measuring a three-dimensional position of an object, it is widely known to use a positional relationship between two image capturing units of a stereo camera and a position of a corresponding point on each of the stereo images acquired by the stereo camera. This technology is used in various fields such as a driver assistance system for a vehicle, a mobile equipment, a game machine, or the like. In the stereo camera, the optical axis of the lens sometimes deviates due to temperature, vibration, aged deterioration or the like. A method for correcting such a deviation uses rectification or parallelization of images.

A known method for the rectification is to detect a deviation in y direction (i.e., the direction intersecting x direction in which the image capturing units of the camera are aligned) of feature points imaged by respective capturing units. The rectification is easily performed regarding the deviation in a roll angle and a pitch angle, since the deviation is observed as a deviation of a y component. However, it is difficult to detect the deviation in a yaw angle, because such a deviation has little influence on the y component, and thus there is a high possibility that an error becomes large due to other factors such as noise.

DETAILED DESCRIPTION

Figure 1:
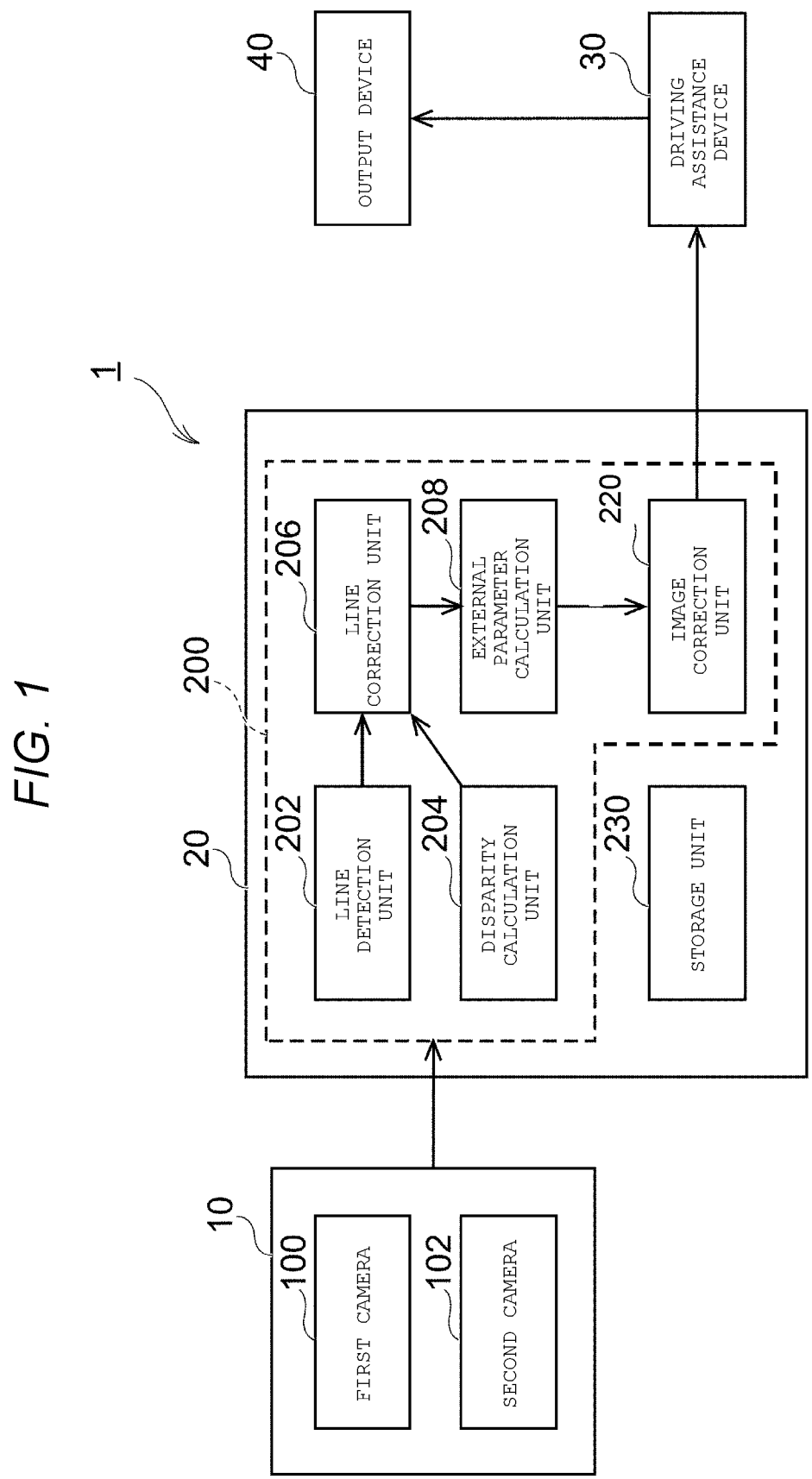
FIG. 1 is a block diagram showing functions of a driving assistance system according to one embodiment.

Embodiments provide an image processing device that achieves correction of a yaw angle with high accuracy.

In general, according to one embodiment, an image processing device used in determining a distance to an object, comprises a memory that stores a stereo image of the object including first and second images, and a processor. The processor is configured to detect first and second reference lines in the first image, calculate disparity between the first and second images, correct, using the calculated disparity, a position of the first reference line in the second image, and calculate a parameter for determining the distance to the object, the parameter indicating a difference between the first and second images based on a distance between the first and second reference lines in the first image and disparity between the first reference line in the first image and the corrected first reference line in the second image.

Hereinafter, embodiments of the present disclosure will be described with reference to the drawings. In the drawings to be referred to, the same reference numerals or similar symbols are affixed to the same portions or portions having similar functions, and the repetitive description thereof may be omitted. In addition, the dimensional ratios of the drawings may be different from the actual ratios for the convenience of explanation, or some of the configurations may be omitted from the drawings. Further, a flow of data shown in each block diagram is shown as an example. That is, in the embodiments described below, it does not indicate that there is no other data flow, and in some cases, the illustrated data flow may not be an essential configuration.

There are two parameters that are necessary for a camera calibration, largely divided into internal parameters and external parameters. The internal parameters are parameters related to a camera-specific characteristic such as a lens, and the external parameters are parameters indicating an installation state of a camera (i.e., position, orientation, or the like). The embodiments described below relate mainly to an image processing device for estimating a yaw angle which is an external parameter.

First Embodiment

FIG. 1 is a block diagram showing functions of a driving assistance system 1 according to a first embodiment. The driving assistance system 1 is a system including a stereo camera 10, an image processing device 20, a driving assistance device 30, and an output device 40, and the system generates three-dimensional information using a stereo image and assists a driving of a vehicle. For example, the driving assistance system 1 is a part of an in-vehicle system mounted on an automobile. That is, the stereo camera 10, the image processing device 20, the driving assistance device 30, and the output device 40 may be mounted on the automobile.

The stereo camera 10 includes a first camera 100 and a second camera 102. These cameras include, for example, a charged coupled device (CCD) image sensor, a complementary metal oxide semiconductor (CMOS) image sensor, or the like as an image capturing element. The first camera 100 images a first image and the second camera images a second image. In an embodiment, a direction perpendicular to an image capturing plane of the first camera 100 is defined as z direction, a direction closer to a vertical direction of the image capturing elements arranged in two dimensions is defined as a y direction, and a direction of the image capturing elements perpendicular to the y direction, that is, a direction closer to a horizontal direction is defined as x direction. Generally, the first camera 100 and the second camera 102 are arranged at a predetermined distance from each other in a direction close to the horizontal direction, that is, in the x direction. For example, these cameras are mounted on the automobile and acquire the stereo images of a road or the like while the automobile is moving and while the automobile is stopped.

In the description of the embodiment, calculation or the like is performed with the first image acquired by the first camera 100 as a reference. However, this is non-limiting, and the second image acquired by the second camera 102 may be used as a reference. That is, the first camera 100 and the second camera 102 have symmetrical relationship, and a reference image can be appropriately replaced according to design and other reasons.

The image processing device 20 includes at least a processor 200, and performs image processing on the first image and the second image imaged by the stereo camera 10. In addition, the image processing device 20 may include modules for image processing required for the system, such as a correction determination unit for determining whether or not to perform correction based on the parameter acquired by the processor 200, a filtering unit for performing various filtering, an affine transformation unit for performing an affine transformation, a pyramid processing unit for generating an image pyramid, and a three-dimensional image processing unit for performing a three-dimensional image configuration. Further, the image processing device 20 may include a storage unit 230 for storing various data.

The processor 200 acquires and outputs the above-described external parameter. The processor performs a function of the image correction unit 220 for calibration of the stereo image and other necessary image processing based on the external parameter output by the processor 200.

The processor 200 further performs, by executing one or more programs, the functions of a line detection unit 202, a disparity calculation unit 204, a line correction unit 206, and an external parameter calculation unit 208.

The line detection unit 202 detects a white line drawn on the road in an input image. For a white line detection, for example, an edge is extracted by scanning an image in the x direction and the white line is detected based on a color difference near the edge. It is not limited thereto, for example, any method may be used as long as a white line can be detected, such as using a Hough transformation after using a Canny filter and further performing threshold processing so as to be recognized as a white line. Additionally, the line detection unit 202 may detect any type of line, such as a slightly curved line and a wavy line. Furthermore, the line detection unit 202 may detect any color of line other than the white line.

The line detection means detecting line segments, half lines, or straight lines which form the two edges defining a white line in an image. That is, both the edge from the road to the white line and the edge from the white line to the road are detected. Among the detected white line edges, the image processing device 20 can select any straight lines to be used for a process. In the following description, in the first image, two straight white lines, the edge on the inner side of the white line existing on the left side of the image (hereinafter called the first reference line) and the edge on the inner side of the white line existing on the right side of the image (hereinafter called second reference line) are used. Further, in the second image, the edge on the inner side of the white line existing on the left side of the image is used. These straight lines are merely selected as examples, and it is possible to process similarly using other edges among the edges of the white lines.

The disparity calculation unit 204 calculates disparity between the first image and the second image. The disparity is calculated, for example, by extracting feature points from both images and obtaining a difference in x coordinates between the feature points. The disparity calculation unit 204 obtains disparity of a region of interest. The disparity calculation unit 204, for example, may set a region of interest (ROI) in advance where a white line is likely to exist and calculate the disparity within the region, and may generate the disparity of an entire image, that is, a disparity image. However, it is not limited thereto. Any disparity between corresponding white line edges in the first image and the second image, for example, between the first reference lines, may be calculated. As another example, the disparity of past frames may be stored in the storage unit 230 and the disparity may be used. In this case, in current frames, the disparity between finally corrected images may be stored in the storage unit 230 so that the disparity can be used for future frames.

The line correction unit 206 corrects a position of the line in the second image using information such as the detected line in the first image or the calculated disparity between the first image and the second image. For example, the position of the white line in the second image is corrected by executing the homography transformation on the previously detected white line in the second image by using a homography matrix indicated by parameters relating to the estimated roll angle and pitch angle.

The external parameter calculation unit 208 calculates the external parameters. In particular, in the present embodiment, the yaw angle is calculated with high accuracy. The external parameter calculation unit 208 calculates not only the yaw angle but also the roll angle, the pitch angle, and other external parameters. It should be noted that the calculation of the external parameters may not directly obtain the roll angle, the pitch angle, the yaw angle, or the like, and may be a process of calculating the transformation matrix of the image or the like using these external parameters. Furthermore, instead of the transformation matrix, a transformation table representing a pixel mapping of the image before and after the transformation may be generated. The transformation table may be stored in the storage unit 230. In this way, the external parameter calculation unit 208 may calculate the transformation matrix generated by the external parameters, not the external parameters themselves.

The image correction unit 220 executes image correction required for driving assistance based on parameters relating to the external parameters output from the external parameter calculation unit 208 and based on images imaged by the stereo camera 10. The image correction may include, for example, a rectification based on the external parameters or a calibration in the first image and the second image using the rectified image. Further, the image correction unit 220 may include a correction determination unit that determines whether or not to perform correction using the external parameters output from the external parameter calculation unit 208.

For example, a distance image, an object recognition image, and the like are output using the corrected image. These images may not be configured as images, may be data in which distance information is listed for pixels, or may be data indicating a region in which an object is recognized. That is, a result output from the image correction unit is not necessarily image data, and may be data obtained from the corrected image.

Based on the data output from the image correction unit 220, the driving assistance device 30 processes data necessary for the driving assistance and outputs the processed data for a driver or to a server connected to a network, or the like via the output device 40. As another example, the corrected image may be output to a drive recorder or the like.

The output device 40 is a device for outputting data processed by the driving assistance device 30, and includes, for example, a display, a touch panel, a speaker, a memory, a hard disk, a network interface, a communication interface with a controller area network (CAN), or the like. According to a command from the driving assistance device 30, the output device 40 outputs assistance information to the display, a speaker or the like, stores data in a memory, a hard disk or the like, provides data to big data via a network, or outputs a signal for controlling the automobile or the like via the CAN.

Figure 2:
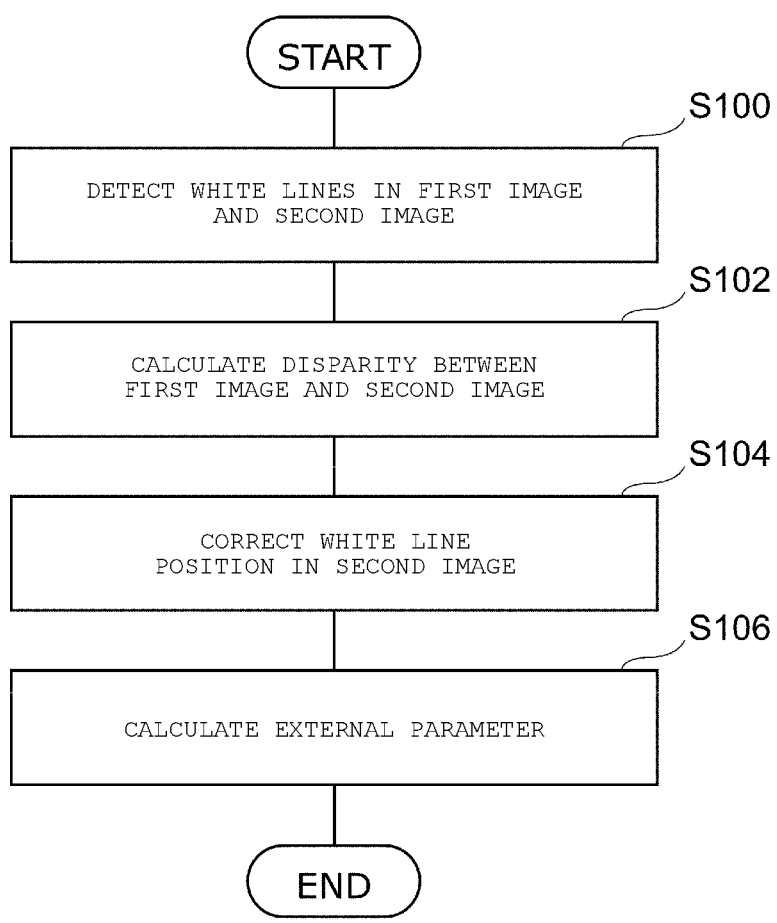
FIG. 2 is a flowchart showing a process of an image processing device according to one embodiment.

FIG. 2 is a flowchart showing a flow of processing according to the present embodiment. The process of each configuration will be described in more detail with reference to the flowchart. The first camera 100 is installed on the left side and images the first image which is an image on the left side, and the second camera 102 is installed on the right side and images the second image which is an image on the right side. The present disclosure is not limited to this, and the left and right positions may be reversed.

First, the line detection unit 202 detects white lines in the first image and the second image imaged by each of the first camera 100 and the second camera 102 (S100). The white line detection is executed, for example, by using various filters or the like.

Figure 3:
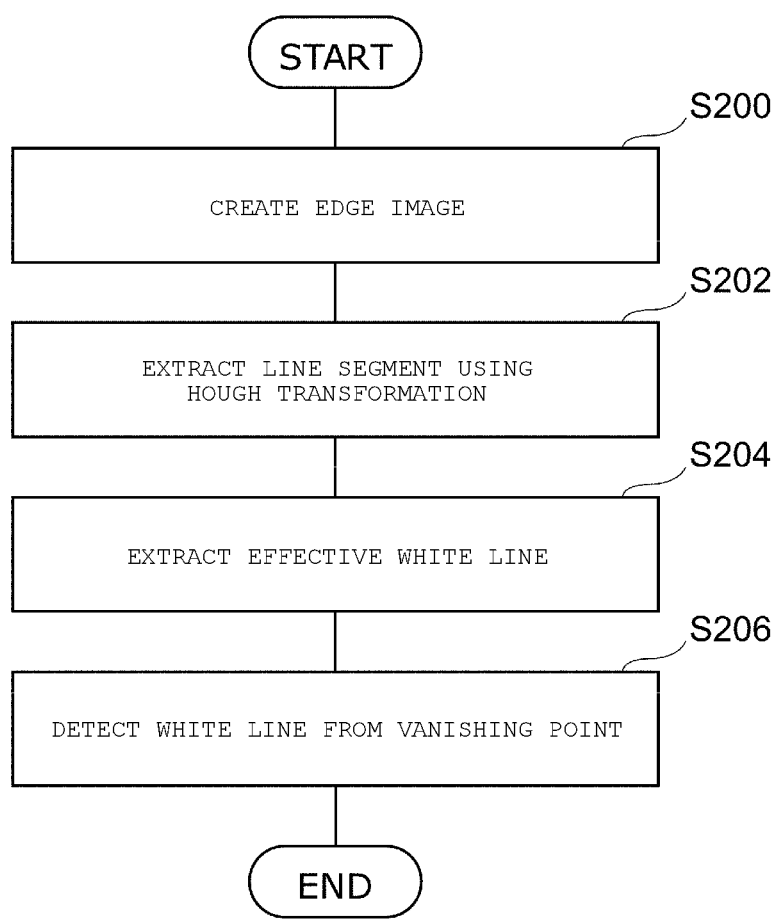
FIG. 3 is a flowchart showing a white line detection processing according to one embodiment.

FIG. 3 is a flowchart showing an example of a white line detection processing. First, an edge image is created using a Canny filter, a Laplacian filter, or the like (S200). Next, a line segment is extracted by applying a Hough transformation or the like to the edge image (S202). Next, an effective white line is extracted (S204). An effective white line is determined, for example, on the basis that (1) the line segment has a length greater than or equal to a threshold value, (2) the lower end extended from the line segment fits within a certain region, and (3) an inclination of the line segment is within the threshold value. Next, the white line is detected from information such as a vanishing point (S206). For example, in a case of nearly parallel white lines, two edges configuring a white line, and extended lines of four line segments of the two edges of white lines on the opposite side of the image which make a pair intersect at the vanishing point. In this way, when there is a vanishing point or when four straight lines intersect each other within a predetermined range, the line segment group is detected as edges of white lines.

Detection of a white line is not limited to these examples. For example, feature points that are edges of white lines focusing on luminance may be extracted and detected by connecting those on a straight line, or a white line may be detected by inputting an image to a learned machine learning model so as to extract a white line in advance.

Returning to FIG. 2, after the white line detection, the disparity calculation unit 204 calculates a disparity between the first image and the second image (S102). The calculation of the disparity is executed using a known method. For example, the disparity calculation unit 204 calculates the disparity by using a template matching method such as a sum of absolute difference (SAD) or normalized cross correlation (NCC) for each region.

It should be noted that previously detected white lines may or may not be used for calculation of disparity. For example, when an equation of white lines corresponding to each other in the first image and the second image is obtained, the disparity may be calculated using the white line equation. On the other hand, when information on the white line is not used, steps of S100 and S102 can be switched. In FIG. 2, S100 and S102 are sequentially executed. However, this is non-limiting, and S100 and S102 may be executed in parallel.

Next, the line correction unit 206 corrects the white line position in the second image (S104). Correction of the white line position is executed via the homography transformation. The line correction unit 206 generates a homography matrix based on the parameters related to the roll angle and the pitch angle obtained up to the current frame, and performs the homography transformation on the white line in the second image. In this case, a predetermined statistical processing may be performed on the roll angle and the pitch angle of a predetermined number of frames in the past, and used for the current frame processing. These data may be stored in the storage unit 230 and used at a necessary timing.

The parameters relating to the roll angle and the pitch angle may be calculated by the line correction unit 206. In this case, for example, each parameter is obtained by using a method such as Hartley ("Theory and practice of projective rectification", International Journal of Computer Vision, 1999, Vol. 35, pp. 115-127), Fusiello ("Quasi-Euclidean uncalibrated epipolar rectification," 19th International Conference on Pattern recognition, 2008, pp. 1-4), and Diverdi ("Geometric calibration for mobile, stereo, autofocus cameras," IEEE Winter Conference on Applications of Computer Vision, 2016, pp. 1-8), and a homography matrix is generated.

For the homography transformation of the white line in the second image, for example, any two points are extracted from the points existing on the left white line edge (hereinafter called the first reference line) and a homography matrix is applied to the two points to acquire coordinates of converted points. From the coordinates of the acquired points, an equation of the straight line of the left white line is calculated. In this way, instead of converting the entire image, at least the equation of the first reference line after conversion is calculated by converting the point on the straight line, and the position of the white line in the second image is corrected. That is, in this step, an output of an image is not indispensable, it suffices to output an equation indicating at least one of the two straight lines or to output coordinates of two or more points of at least one straight line of the two straight lines.

Next, the external parameter calculation unit 208 calculates parameters relating to the external parameters (S106). In particular, the external parameter calculation unit 208 calculates parameters related to the yaw angle.

Figure 4:
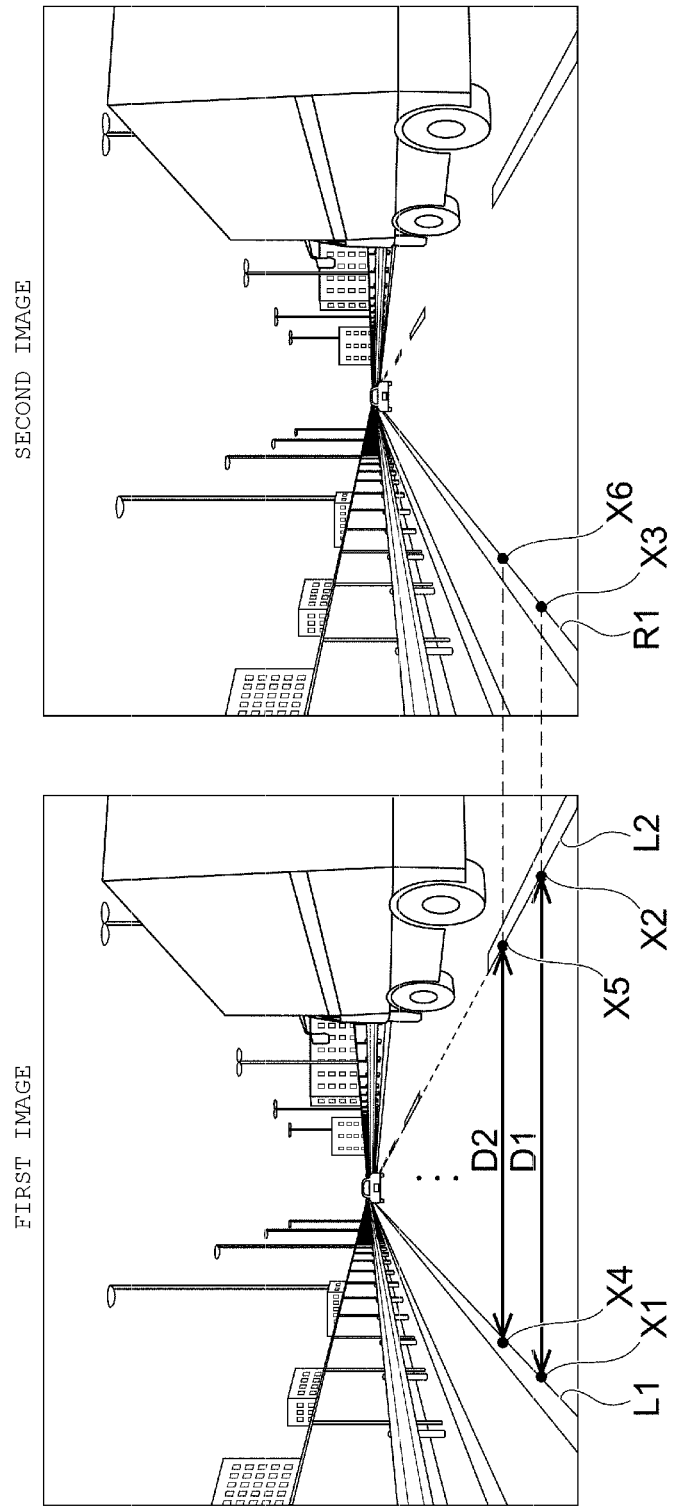
FIG. 4 is a diagram showing white line edges, disparity, and white line widths according to one embodiment.

FIG. 4 is a diagram for explaining external parameter calculation according to the present embodiment. In FIG. 4, the first image is an image acquired from the first camera 100, and the second image is an image obtained by performing the white line position correction on the image acquired from the second camera 102. Although all targets are shown for the sake of explanation in the second image, as described above, even if there is only an equation of the straight line of the edge of the target white line, it is possible to perform the processing explained below. Also, Xn (n is an integer) in the figure represents an x component of the indicated point.

White lines are generally parallel to each other in pairs. Therefore, the external parameters are corrected by optimizing as follows. It should be noted that to be parallel is not necessarily strictly parallel.

As shown in FIG. 4, in the first image and the second image, the y direction of the white line is corrected so that the same distance from the image capturing plane becomes the same y component via the nomography transformation. For example, a distance between one point on the first reference line L1 that is the left white line edge in the first image and one point on the second reference line L2 that is the right white line edge in the same y component is defined as a white line width D1. That is, the distance between each point of the first reference line and of the second reference line having the same y component is defined as the white line width. Assuming that the x component of each point is X1 and X2, it is represented as D1=X2–X1. Further, when X3 is defined as the x component of the point in the second image corresponding to the left point, that is, the x component of the point on the first reference line R1, the disparity at the point on the edge is represented as X1–X3. Similarly, using the point on the left white line edge L1, D2=X5–X4 and disparity=X4–X6. Further, the white line width and the disparity are calculated for a desired number of points on the left white line edge L1. This disparity calculation may be performed by the disparity calculation unit 204 based on the above counting.

By optimizing the following formula after calculating the white line width and the disparity, it is possible to optimize yaw angle by using a non-linear optimization method of the parameter represented by the yaw angle.

$$\sum \left\{ -\frac{\text{parallax } 1 \times \text{white\_line\_width2} -}{\text{white\_line\_width1} \times \text{parallax } 2} \right\}^2 \quad \text{[Formula 1]}$$
$$\phantom{\sum}\left\{\phantom{-\frac{\text{parallax } 1 \times \text{white\_line\_width2}}{\text{parallax } 2 - \text{parallax } 1}}\right\}$$

More specifically, the optimization of the yaw angle is performed by optimizing the parameters so that the value indicated by Formula 1 approaches zero. The white line width 1 and the disparity 1 indicate the white line width and the disparity in a certain y component Y1, and the white line width 2 and the disparity 2 indicate the white line width and the disparity in different y component Y2. For example, when ten points are selected from L1, for all combinations extracting two points from these ten points, { }² in the above formula is calculated and the sum of these is obtained. Then, the parameter of the yaw angle is optimized so that the value represented by the above equation becomes smaller. This means that at the vanishing point (i.e., the point where the white line width=0), the disparity is optimized to be zero.

After the parameter of the yaw angle are calculated by the external parameter calculation unit 208 and outputted, the image processing device 20 executes an image processing required for other driving assistance. The processed image is outputted to the driving assistance device 30, processed appropriately by the driving assistance device 30, and outputted to a user such as a driver or outputted as a signal for controlling the automobile via the output device 40.

In FIG. 4, the first reference line is described as a white line edge on the left side and the second reference line is described as a white line edge on the right side. However, this is non-limiting, and a white line edge on the right side may be used as a first reference line. Since the first reference line and the second reference line are straight lines serving as a reference for correction, any of the reference straight lines may be defined as a first reference line and a second reference line.

If necessary, the calculated external parameters of the current frame may be stored in the storage unit 230 so as to be reflected in subsequent frames. In addition to the external parameters, information on a point on a white line edge or information on a white line width, a disparity or the like corresponding to the point may be stored in the storage unit 230. The counting in the subsequent frames may be performed by using these stored data. For example, when the line detection unit 202 detects a white line, it is possible to reduce a calculation cost and a counting time by detecting the edge from the region around the relevant points. The same is applied for the disparity, and when the disparity calculation unit 204 calculates the disparity, similarly, it is also possible to reduce a calculation cost and a counting time by analyzing the first image and the second image based on the disparity which is previously obtained.

When the external parameters are stored in the storage unit 230 and are reflected on the subsequent frames, a statistical processing of the external parameters may be performed over a predetermined number of past frames. By performing the statistical processing, it is possible to reduce the influence of detection errors and optimization errors that exceed a statistical error tolerance value. As a non-limiting example, the statistical processing means an average value, a variance value, a standard deviation value, a covariance value, or the like. It may also be a median, a mode, or the like, or another statistically usable value. For example, the parameters for correcting the white line position in the above-described S104 may be generated by using these statistical values.

Further, the calculation of the disparity need not be performed at the timing of S102. That is, in FIG. 2, the step S102 may be omitted. In this case, the disparity may be calculated based on the position of the white line in the first image detected in S100 and the position of the white line in the second image corrected in S104, and the external parameter calculation may be executed in S106. In this way, each step can be performed before the step where the information acquired in the relevant step is necessary.

As described above, according to the present embodiment, instead of correcting the entire image, it is possible to calculate the external parameters by correcting the information on the white line. In this manner, by correcting only the information on the white line, a calculation cost and a memory cost can be reduced, and for example, correction can be performed in real time in driving assistance.

More specifically, in order to obtain an accurate correction value of the yaw angle, it is necessary to use a rectified image, which requires a correction value of the roll angle and the pitch angle, but a stable correction of the roll angle and the pitch angle often requires a plurality of frames. When the yaw angle correction value is obtained after calculating the roll angle and the pitch angle, the latency becomes long. Images of past frames are stored in the memory so as to reduce the latency, and the correction of the yaw angle is executed from the stored information. According to the present embodiment, there is no need to store images of such past frames, and it is possible to reduce the amount of memory consumption. In addition, the estimation of the yaw angle often requires a plurality of frames, and the latency is further increased in this case. According to the present embodiment, it is also possible to reduce latency relating to the estimation of the yaw angle.

Second Embodiment

In the above-described first embodiment, it is necessary to detect a white line in the second image. In the present embodiment, it is intended to calculate external parameters without detecting a white line in the second image.

Figure 5:
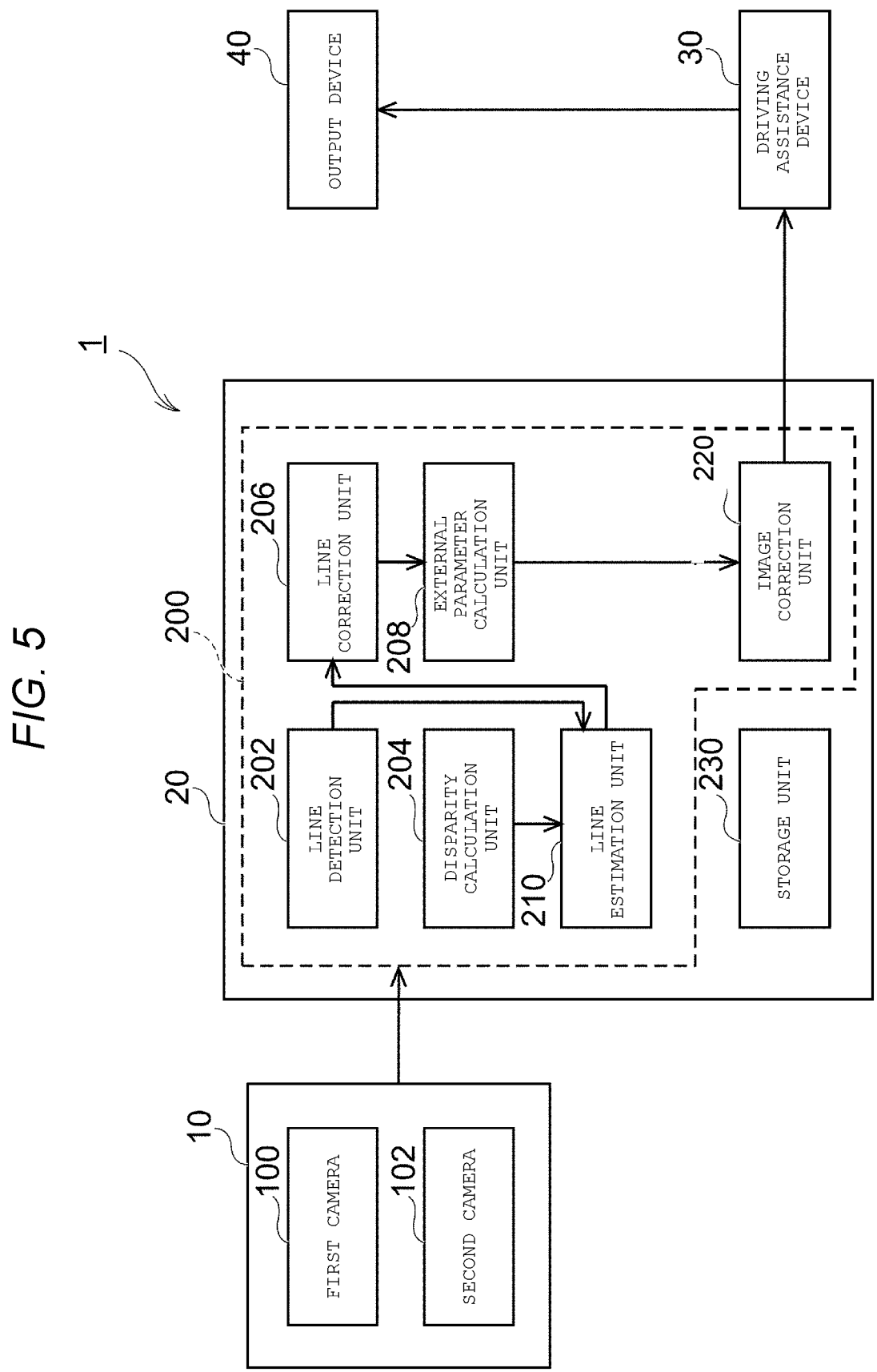
FIG. 5 is a block diagram showing functions of a driving assistance system according to one embodiment.

FIG. 5 is a block diagram showing functions of a driving assistance system 1 according to the present embodiment. The external parameter acquisition unit 200 of the image processing device 20 further includes a line estimation unit 210.

The line estimation unit 210 estimates the position of a first reference line in the second image from the first reference line and the second reference line in the first image detected by the line detection unit 202 and the disparity calculated by the disparity calculation unit 204.

Figure 6:
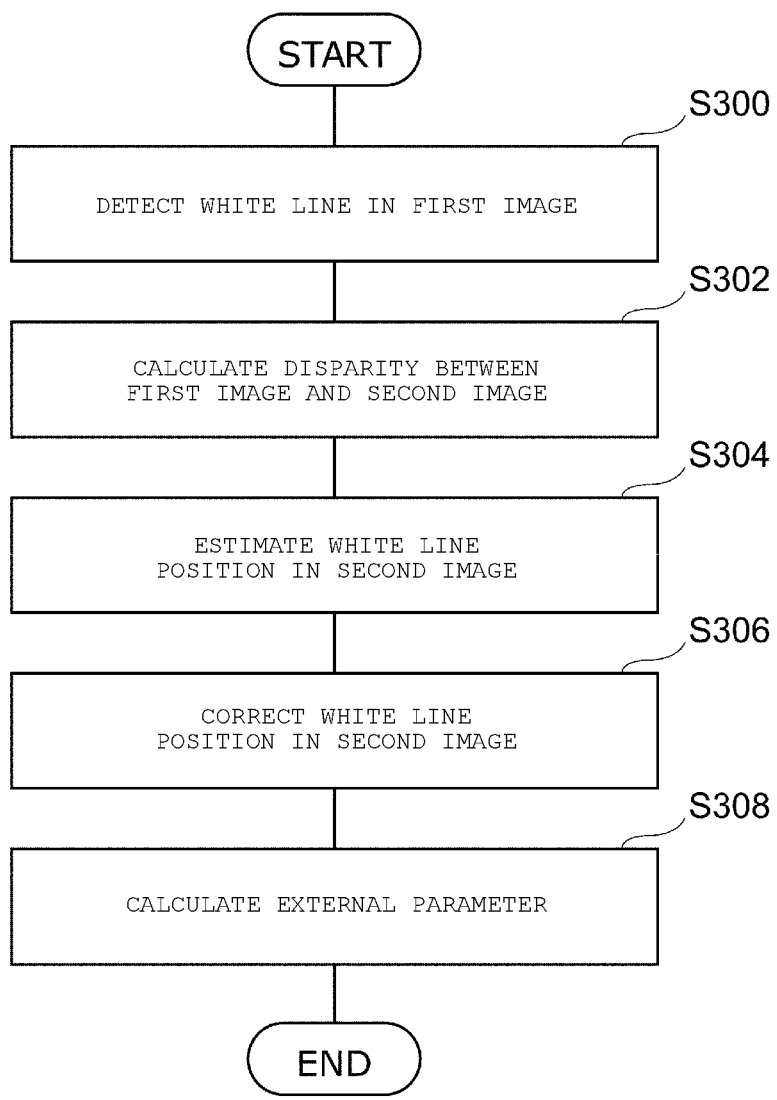
FIG. 6 is a flowchart showing a process of an image processing device according to one embodiment.

FIG. 6 is a flowchart showing a process of an image processing device 20 according to the present embodiment.

First, the line detection unit 202 detects a white line in the first image (S300). Next, the disparity calculation unit 204 calculates a disparity between the first image and the second image (S302). As in the above-described embodiment, these processes may be processed in reverse order or may be processed in parallel.

Next, the line estimation unit 210 estimates the position of the white line in the second image based on the detection result of the white line edge in the first image and the disparity (S304). For example, a case of estimating the position of the first reference line R1 in the second image from the first reference line L1 in the first image shown in FIG. 4 will be described.

Figure 7:
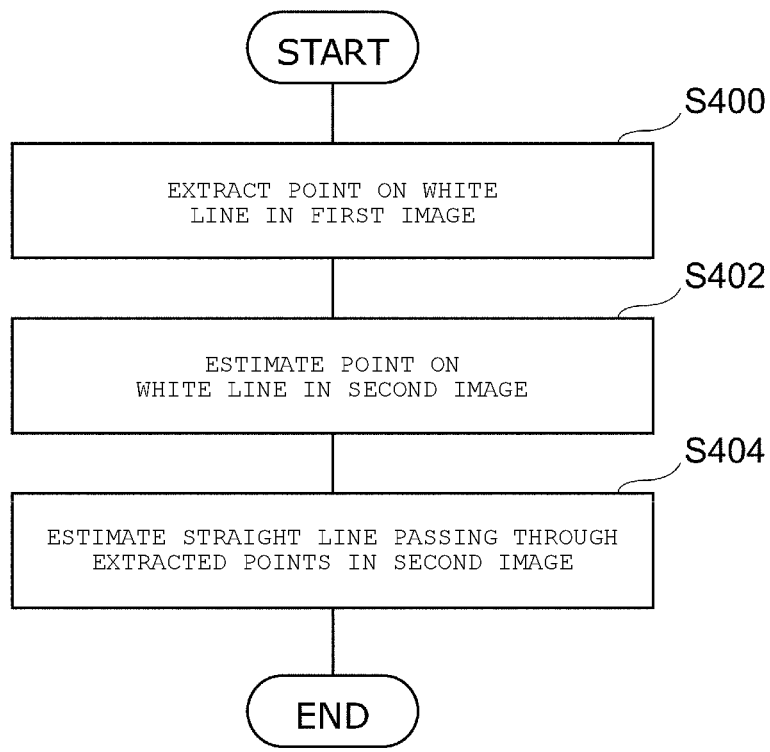
FIG. 7 is a flowchart showing a white line estimation processing according to one embodiment.

FIG. 7 is a flowchart showing a white line estimation processing in the second image. First, some points of the first reference line detected by the line detection unit 202 in the first image are extracted (S400). The points are extracted, for example, every 5 pixels in the y direction from a bottom of the image. The present embodiment is not limited to this, any two or more points may be extracted by any methods. When the line detection unit 202 detects a white line by extracting a feature point at an edge and detects a white line, for example, by extracting as a feature point based on a luminance difference between the road plane and the white line plane, a differential value, or the like, any desired number of such feature points may be extracted.

Next, for a plurality of extracted points, points existing on the first reference line on the second image are estimated using a disparity (S402). More specifically, they are estimated by calculating points corresponding to the points on the second image using the disparity information at each extracted point on the first image. Since the estimation is executed using the calculated disparity, they are not necessarily estimated to be on a straight line in the second image.

Then, the equation of the white line edge (i.e., the first reference line R1) is estimated using regression analysis such as a least squares method on the estimated points (S404). It should be noted that the white line estimation does not need to generate the estimated image, similarly to the correction of the white line in the above-described embodiment, and it suffices to calculate at least the equation of the first reference line R1.

As described above, the line estimation unit 210 estimates the position of the white line edge in the second image and at least information on at least one reference line, based on the information on the detected white line edge in the first image and the calculated disparity between the first image and the second image.

Returning to FIG. 6, next, the line correction unit 206 corrects the white line position in the second image, for example, at least the first reference line R1 (S306). Specifically, the same process as S104 in the above-described embodiment is performed. Also, the external parameter calculation unit 208 calculates the external parameters (S308). The calculation of the external parameters is performed in the same manner as S106 in the above-described embodiment.

As described above, according to the present embodiment, it is possible to execute the external parameter calculation processing without executing the white line detection of the second image and without generating the corrected image as in the above-described embodiment. In general, the white line detection processing is a process having a higher cost than the other processes, so that according to this embodiment, the calculation cost can be further reduced.

Figure 8:
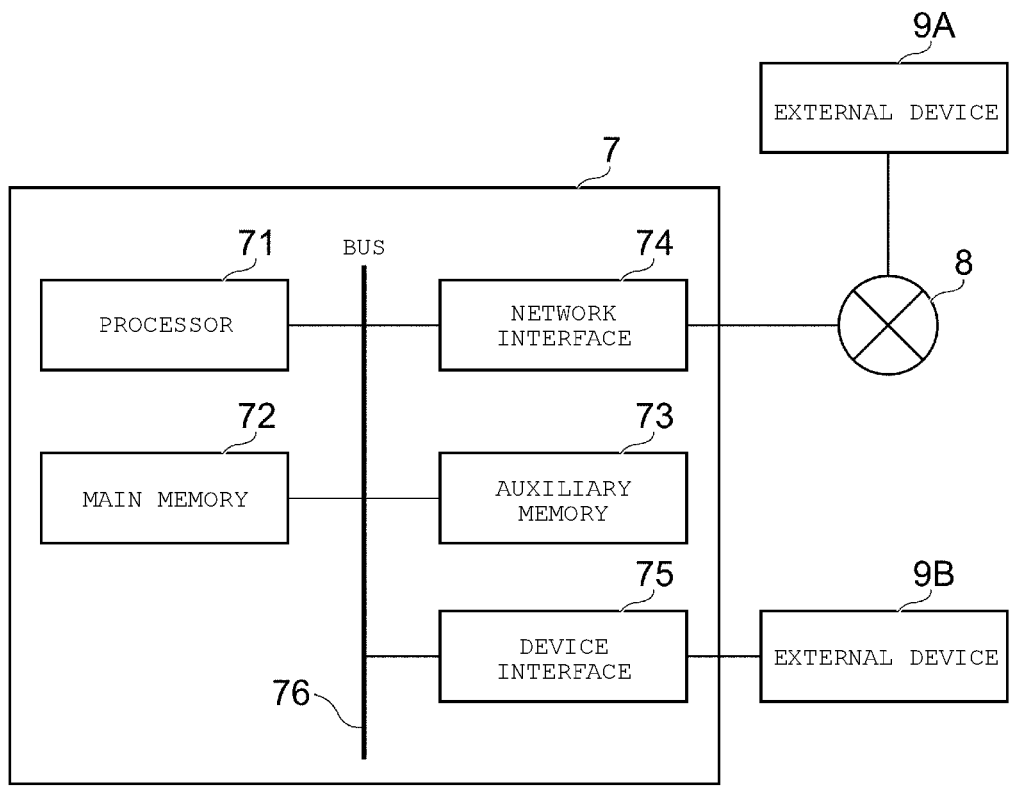
FIG. 8 is a diagram showing a hardware configuration of an image processing device according to one embodiment.

FIG. 8 is a block diagram showing a hardware implementation of the image processing device 20 according to each embodiment. The image processing device 20 includes a processor 71, a main memory 72, an auxiliary memory 73, a network interface 74, and a device interface 75, which can be implemented as a device 7 connected via a bus 76. The device may be a computer device which itself may be booted independently or may be incorporated in a separately bootable computer device or may be a connected accelerator.

While the device 7 in FIG. 8 includes one component for each component, it may have a plurality of the same components. Also, while one device 7 is shown, software may be installed in a plurality of computer devices, and each of the plurality of computer devices may execute processing of a different part of the software.

The processor 71 is an electronic circuit that operates as a processing circuit including a control device and a counting device of the device. The processor 71 performs the counting processing based on data or a program input from each device of an internal configuration of the device 7 and outputs a counting result and control signals to each device or the like. Specifically, the processor 71 controls each component configuring the device 7 by executing an operating system (OS) of the device 7, an application, or the like. The processor 71 is not particularly limited as long as it can perform the above process. The function of each component of the image processing device 20 may be performed by the processor 71.

The main memory 72 stores instructions executed by the processor 71, various data, or the like, and information stored in the main memory 72 is directly read by the processor 71. The auxiliary memory 73 is a memory other than the main memory 72. These memories are any electronic components capable of storing electronic information. Alternatively, the auxiliary memory 73 may be a storage device, such as an HDD. In addition, the memory includes a volatile memory and a non-volatile memory in the memory, and either of them may be used. A memory for storing various data in the image processing device 20 may be implemented by the main memory 72 or the auxiliary memory 73. For example, the storage unit 230 may be implemented by the main memory 72 or the auxiliary memory 73. As another example, in a case where an accelerator is further provided in the device 7, the storage unit 230 may be implemented by a memory provided in the accelerator.

The network interface 74 is an interface for connecting to a communication network 8 by radio or wire. As the network interface 74, one complying with existing communication standards may be used. The network interface 74 may exchange information with an external device 9A communicatively connected via the communication network 8.

The external device 9A includes, for example, a stereo camera, a motion capture, an output destination device, an external sensor, an input source device, or the like. Further, the external device 9A may be a device having some functions of the component of the image processing device 20. Then, the device 7 may communicate a part of the processing result of the image processing device 20 via the communication network 8 like a cloud service.

The device interface 75 is an interface such as a universal serial bus (USB) directly connected to the external device 9B. The external device 9B may be an external storage medium or a storage device. The storage unit 230 may be implemented by the external device 9B.

The external device 9B may be an output device. The output device may be, for example, a display device for displaying an image or a device for outputting sound or the like. The output device includes, for example, a liquid crystal display (LCD), cathode ray tube (CRT), plasma display panel (PDP), speaker, or the like, however, it is not limited thereto. It may also be a component of an automobile controlled via a CAN.

The external device 9B may be an input device. The input device includes a device such as a keyboard, a mouse, a touch panel, or the like, and transfers information input by these devices to the device 7. Signals from the input device are output to the processor 71.

As described above, in all the above descriptions, at least a part of the image processing device 20 may be configured with hardware or may be configured with software and the functions are performed by a CPU or the like by a software information processing. When configured with the software, a program for implementing at least a part of its functions may be stored on a flexible disk, a CD-ROM, or the like, and may be read and executed by a computer. The storage medium is not limited to a removable storage medium such as a magnetic disk or an optical disk, and may be a fixed storage medium such as a hard disk device or a memory. In other words, information processing by the software may be specifically implemented by using hardware resources. Furthermore, the processing by the software may be implemented in a circuit such as an FPGA and may be executed by hardware.

For example, a computer may read dedicated software stored in a storage medium readable by the computer, so that the computer can be the device of the above embodiment. The type of storage medium is not particularly limited. In addition, the dedicated software downloaded via the communication network may be installed on the computer, so that the computer can be the apparatus of the above embodiment. In this way, information processing by the software may be specifically implemented by using hardware resources.

While several embodiments of the disclosure are described, these embodiments are illustrated by way of example and are not intended to limit the scope of the disclosure. These novel embodiments may be implemented in various other forms and various omissions, substitutions, and changes may be made without departing from the spirit of the disclosure. These embodiments and modifications thereof will fall within the scope and gist of the disclosure, and will be covered by in the disclosure described in the claims and the equivalent scope thereof.

For example, in all of the embodiments described above, the disparity and the width between the white lines are acquired based on the detected white lines for simplicity of explanation, however, the present disclosure is not limited to this. Instead of a white line, it may be a line of another color such as an orange line, a green line, a blue line or the like, and may be a straight line such as a curb, a guardrail, a wall beside the road, cat's eye installed on the road, or the like.

Furthermore, if the disparity can be acquired on the same line in the first image and the second image, it may also possible to acquire the width of the existing region between the other objects, such as the width between the curb and the white line instead of the width between the white lines. In this way, it is possible not to use a white line as a reference line. In this case, the line detection unit 202 is the reference line detection unit, the line correction unit 206 is the reference line correction unit, and the line estimation unit 210 is the reference line estimation unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device used in determining a distance to an object from a stereo image, comprising:
    a memory that stores the stereo image of the object including first and second images, wherein the object is captured in the images; and
    a processor configured to:
        detect first and second reference lines in the first image and corresponding first and second reference lines in the second image, and determine a pixel location of the first reference line in each of the first and second images;
        calculate a disparity between the first and second images;
        correct the pixel location of the first reference line in the second image using a homography transformation by which the disparity between the first and second images with respect to pitch and roll angle directions can be corrected;
        calculate a correction parameter for correcting the disparity between the first and second images with respect to a yaw angle direction, using a distance between the first and second reference lines in the first image, the pixel location of the first reference line in the first image, and the corrected pixel location of the first reference line in the second image; and
        correct the disparity between the first and second images with respect to the yaw angle direction using the calculated correction parameter.

2. The image processing device according to claim 1, wherein
    the processor corrects the pixel location of the first reference line in the second image without generating a corrected image of the second image.

3. The image processing device according to claim 1, wherein
    the processor calculates the correction parameter by non-linear optimization.

4. The image processing device according to claim 1, wherein
    the processor is configured to
        estimate the pixel location of the first reference line in the second image based on the detected first reference line in the first image.

5. The image processing device according to claim 4, wherein
the processor is configured to, before estimating the pixel location of the first reference line in the second image, estimate pixel locations of a plurality of points in the second image corresponding to a plurality of points of the first reference line in the first image.

6. The image processing device according to claim 1, wherein
the processor is configured to perform edge detection for detecting the first and second reference lines in the first image.

7. The image processing device according to claim 1, wherein
the correction parameter is a parameter for calibrating a camera that has captured the stereo image.

8. A driving assistance system comprising:
a stereo camera configured to acquire a stereo image of an object including first and second images, wherein the object is captured in the images;
an image processing device that includes a processor configured to:
  detect first and second reference lines in the first image and corresponding first and second reference lines in the second image, and determine a pixel location of the first reference line in each of the first and second images,
  calculate a disparity between the first and second images,
  correct the pixel location of the first reference line in the second image using a homography transformation by which the disparity between the first and second images with respect to pitch and roll angle directions can be corrected,
  calculate a correction parameter for correcting the disparity between the first and second images with respect to a yaw angle direction, using a distance between the first and second reference lines in the first image, the pixel location of the first reference line in the first image, and the corrected pixel location of the first reference line in the second image, and
  correct the first and second images by correcting the disparity between the first and second images with respect to the yaw angle direction using the calculated correction parameter, and
  output the corrected first and second images; and
a driving assistance device configured to output information for assisting a driver based on the first and second images output by the image processing device.

9. The driving assistance system according to claim 8, wherein
the processor corrects the pixel location of the first reference line in the second image without generating a corrected image of the second image.

10. The driving assistance system according to claim 8, wherein
the processor calculates the correction parameter by non-linear optimization.

11. The driving assistance system according to claim 8, wherein
the processor is configured to
  estimate the pixel location of the first reference line in the second image based on the detected first reference line in the first image.

12. The driving assistance system according to claim 8, wherein
the processor is configured to, before estimating the pixel location of the first reference line in the second image, estimate pixel locations of a plurality of points in the second image corresponding to a plurality of points of the first reference line in the first image.

13. The driving assistance system according to claim 8, wherein
the processor is configured to perform edge detection for detecting the first and second reference lines in the first image.

\* \* \* \* \*